October 18, 1913.

DRAWING

6,668

A careful search has been made this day for the original drawing or a photolithographic copy of the same, for the purpose of reproducing the said drawing to form a part of this book, but at this time nothing can be found from which a reproduction can be made.

Finis D. Morris,
           Chief of Division E.

AWK

UNITED STATES PATENT OFFICE.

JOSEPH GARSIDE AND HENRY J. BETJEMANN, OF HARRISON, OHIO.

MACHINERY FOR CUTTING SCREWS IN BEDSTEADS.

Specification of Letters Patent No. 6,668, dated August 28, 1849.

*To all whom it may concern:*

Be it known that we, JOSEPH GARSIDE and HENRY J. BETJEMANN, of Harrison, in the county of Hamilton and State of Ohio, have invented a new and useful Improvement in Machinery for the Cutting of Screws in the Posts and Upon the Rails of Bedsteads and for other Purposes, which is described as follows, reference being had to the annexed drawings of the same, making part of this specification.

Figure 1 is a top view of the machine when ready for cutting the right and left screws on the rails simultaneously at both ends. Fig. 2 is a side elevation of ditto. Fig. 3 is a side view of the cutter and its shank. Fig. 4 is an end view of ditto. Fig. 5 is a plan of the flanged nut. Fig. 6 is an elevation of the tap for cutting the female screw and frame in which it is placed to be operated. Fig. 7 is a vertical section of ditto. Fig. 8 is a plan of the ferrules or ring for cutting a larger female screw. Fig. 9 is a side view of the ferrule, showing its application to the tap.

The arrows in the several figures show the direction of the movements of the several parts.

Similar letters in the several figures refer to corresponding parts.

In the annexed drawings Figs. 1 and 2 represent the machine prepared for cutting the right and left hand screws upon the rail.

A is the propelling and connecting rod for carrying the connecting gearing and propelling screws.

B B are two adjustive sliding screws, the one right and the other left, made to slide on and be screwed to rod A and propelled by it.

($a$ $a$) are set screws passing through the screws B B and entering slightly, or pressing against, the periphery of the propelling rod A, for securing them on any part of rod A required, according to the length or distance required of screws to be cut.

C C are two flanged traversing nuts fitting and working on the aforesaid right and left hand sliding screws B B whose threads are of the same pitch as the screws to be cut. The flanges are lettered C' C'.

D D are two V shaped cutters for cutting the screws, in whose shanks are two oblong mortises or grooves $m$ to admit screws ($b$) by which they are fastened to the flanges of the nuts C, and by which mortises the cutters can be shifted and held in any required position according to the size or diameter of screws to be cut, by sliding them over the said screws $b$. $b$ $b$ are the aforesaid screws which pass through the shanks of the cutters into the flanges C', C'.

E is the driver to hold and turn the article upon which the screw is to be cut.

$e$ is the face plate of the driver, which answers the office of a chuck, provided with spurs that enter the end of the rail and by which it is held securely.

F is a horizontal screw passing through a sliding block L for holding the other end of the article to be cut; or the end opposite that fastened to the face plate. This screw forces the rail against the face plate $e$.

G G are two 4 inch pinions, working into each other for turning simultaneously the propelling rod A and screws B—at a like speed—said pinions turning in contrary directions, or toward each other.

H H H H are the bearings or boxes of the aforesaid propelling rod A and driver E.

I is a crank for turning the propelling rod, when operated by hand. The machine may be operated by any convenient power.

L is a sliding block working on the bench and fastened by a wedge or screw in the position required. The propelling rod A passes through this block and has a bearing therein. Also the screw F.

$s$—screw passing through the lip $l$ of the cutter and bearing against a small spring or plate $n$ attached thereto for regulating the depth of the cutting of the V-shaped cutter, by causing said spring plate to slide over the surface of the article to be cut.

Operation: To cut the screws on the rails, first set the cutters to any length required on the propelling rod A by sliding the screws B B on said rod and making them fast by means of the screws ($a$ $a$). Then drive the rail against the face plate $e$ of the driver E by means of the screw F. Adjust the V-shaped cutters to the required positions by turning the screws ($b$ $b$) and bring them to, or against, the article to be cut. Then turn the crank L and both the right and left screws will be cut simultaneously on the ends of the rail. The spring plate ($n$) attached to the lip ($l$) of the cutter sliding on the outer surface of the rail or article to be cut for regulating the depth of cutting, and adjusted or gauged by means of the screw (*s*) passing through the lip (*l*) and bearing against the spring plate, by which the thread will always be cut of a uniform depth during the operation. This spring plate and adjusting screw may be omitted and the lip caused to slide on the article to be cut. In this case the depth of thread will always be the same. The operation of adapting the cutter for various diameters of rails is effected by means of the screw (*b*) and mortise (*m*). The set screw (*s*) may be used without the plate (*n*), but the operation would not be so effective as with its use. Several rails may be cut simultaneously by the same motive power by multiplying the gearing, cutters, and the other necessary appendages above described, which any skillful mechanic will readily perceive.

The advantages gained by the before described simultaneous screw cutter over other machines in use for the same purpose are many and of great benefit viz: 1st, one half the time of cutting the screws is saved as both screws are cut at once. 2nd, the motion of each cutter (and thread) being regulated by the screws (*a*) pressing against the propelling rod at one and the same time the screws cut on the ends of the rail must consequently be mathematically correct. 3rd. As the two cutters start (or are thrown into action) simultaneously—and finish cutting in the same manner—both screws are of an equal length and will enter the right and left hand thread of the posts at the same point so that a perfect and accurate joint is always certain which is not the case with those cut alternately. 4th. The whole of the time lost with other machines in arranging the cutters in a line so as to get the screws on either end of the rails to enter the posts at the same time is entirely obviated by the simultaneous method of cutting as in this case the cutters being once set they cannot err; thus saving as much time as is expended in the actual operation of cutting the screws. 5th. By this method we entirtly do away with the necessity of fitting up the rails and posts as the cutters will not spring in cutting the screws by inequalities or knots in the wood and through this agency alone we save a large amount of time. 6th. The applicability of our machine to any shape, size, or length of screws. 7th. The machine can be made almost entirely of wood, thus reducing the expense of construction nearly one half. Thus combining at once increased speed, accuracy, variety of taper, size, and length, with cheapness of machinery.

In order to cut the thread or female screw in the post to correspond with the male screw on the rail take the sliding screw B from the arm A Figs. 1 and 2 and put it on the round shank M Figs. 6 and 7 of the top and secure it by the screw (*a*) in a position to correspond with the size of the stuff to be cut. Then take the flanged nut C and fasten it by its flanges C' and screws W in the frame and insert the screw B into the nut C in a vertical position. Then put the post in a horizontal position under the body of the tap and secure it by the screw V. Turn the handle X until the tap enters the hole in the post and continue turning it until the thread is cut the chips passing to the interior of the tap. Then withdraw the tap and in withdrawing it the driver or discharger Q will discharge the chips. The use of the aforesaid driver Q removes the evil experience in the use of the tap with a spiral thread, arising from choking and bursting as the chips pass into a smooth chamber inside the tap without any obstruction, from whence they are discharged by simply raising the tap, the driver remaining stationary.

When a sufficient number of female screws have been cut with this screw and tap and V shaped cutter, take off this screw B, and replace it by another, and substitute another nut corresponding with said screw for the one last named, lettered C and take out the V shaped cutter lettered S and put it into the dovetailed groove $S^2$, Fig. 7, inclining in an opposite direction on the opposite side of the tap. Secure the post in the frame in the manner above described. Turn the handle X in an opposite direction and it will cut a screw in a reverse position to that just described—thus saving the expense of a separate tap.

In order to adapt the tap for cutting screws of greater diameter a ferrule or cylinder T Figs. 8 and 9 is put over the tap—the inside diameter or bore being equal to the outer diameter of this tap and the outer diameter of the ferrule being the size of the hole in the post into which it is inserted having dovetailed grooves in its periphery into which the V cutters S, are inserted, as described above.

The following is a description of the apparatus for cutting the female screws in the posts—referred to above.

*f* is the frame.

M is the shank of the tap same diameter as rod A.

N is the body of the tap, same diameter as the hole bored in the post to admit it before cutting the screw therein, having a cylindrical chamber $N^2$ in the center of the same, about 6 inches long and of suitable diameter, leaving the body of the tap about three sixteenths of an inch thick; into which chamber the chips pass while the screw is being cut.

P P are two vertical mortises opposite each other, made in the upper end of the body of the tap, to admit the arms *r* of a nut R, to slide up and down therein.

Q is a clearer for clearing the chips from the chamber when the nut is withdrawn. It is screwed into the nut R—said nut serving as a guide for the said clearer having the two arms *r*, that slide up and down in the aforesaid mortises.

R is the nut with arms.

S is a V cutter made a little tapering and dovetailed into the body of the tap N.

T is a ring or ferrule, fastened by a key or wedge *t* on the ends of the body of the tap N, into which the V cutter is dovetailed, by which a larger female screw can be cut.

U is a guide through which the body of the tap N passes, and in which there is a chamber for the arms *r* of the nut R to revolve in as the tap goes around—and on the top of which there is a plate *u* which keeps it from raising when the tap is withdrawn.

V is a screw in the frame for holding the post.

W W screws passing through holes in the flanges of the nuts C to fasten it to the frame.

X handle, or wrench of the tap for turning it.

What we claim as our invention and desire to secure by Letters Patent is—

The combination of the driver or clearer Q, with the hollow cylinder tap N, for keeping the cutter clear of chips during the operation of cutting the female screw in posts for bedsteads and for other purposes, substantially as described.

JOSEPH GARSIDE.
HENRY J. BETJEMANN.

In presence of—
D. L. BROWN,
THOMAS HURST.